(12) United States Patent
Moreno Aparicio et al.

(10) Patent No.: US 10,655,998 B2
(45) Date of Patent: May 19, 2020

(54) DISPENSERS AND METHODS FOR USING THE SAME

(71) Applicant: SILGAN DISPENSING SYSTEMS NETHERLANDS B.V., Waalwiik (NL)

(72) Inventors: Alberto A. Moreno Aparicio, Drunen (NL); Stefan Koster, Rotterdam (NL); Eelco Han De Man, Vlijmen (NL)

(73) Assignee: Silgan Dispensing Systems Netherlands B.V., Waalwijk (NL)

( * ) Notice: Subject to any disclaimer, the term of this patent is extended or adjusted under 35 U.S.C. 154(b) by 0 days.

(21) Appl. No.: 16/280,658

(22) Filed: Feb. 20, 2019

(65) Prior Publication Data

US 2019/0186971 A1    Jun. 20, 2019

Related U.S. Application Data

(63) Continuation of application No. 15/538,749, filed as application No. PCT/EP2016/074628 on Oct. 13, 2016, now Pat. No. 10,228,272.

(60) Provisional application No. 62/240,788, filed on Oct. 13, 2015.

(51) Int. Cl.
| | |
|---|---|
| *G01F 11/02* | (2006.01) |
| *B65B 3/32* | (2006.01) |
| *B05B 11/00* | (2006.01) |
| *A47K 5/12* | (2006.01) |

(52) U.S. Cl.
CPC .............. *G01F 11/024* (2013.01); *B65B 3/32* (2013.01); *G01F 11/023* (2013.01); *G01F 11/025* (2013.01); *G01F 11/029* (2013.01); *A47K 5/1201* (2013.01); *A47K 5/1202* (2013.01); *B05B 11/00416* (2018.08); *B05B 11/3074* (2013.01)

(58) Field of Classification Search
CPC .... G01F 11/024; G01F 11/023; G01F 11/029; G01F 11/025; B65B 3/32; B05B 11/0048; B05B 11/3074; B05B 11/00416; A47K 5/1201; A47K 5/1202

See application file for complete search history.

(56) References Cited

U.S. PATENT DOCUMENTS

| | | | |
|---|---|---|---|
| 5,489,044 A | 2/1996 | Ophardt | |
| 6,082,593 A | 7/2000 | Borcherds | |
| 7,198,175 B2 | 4/2007 | Ophardt | |
| 8,313,008 B2 | 11/2012 | Ciavarella et al. | |
| 10,228,272 B2 * | 3/2019 | Moreno Aparicio | ........................ G01F 11/025 |

FOREIGN PATENT DOCUMENTS

| | | |
|---|---|---|
| DE | 10331703 A1 | 1/2005 |
| EP | 2005871 A2 | 12/2008 |

* cited by examiner

*Primary Examiner* — Frederick C Nicolas
(74) *Attorney, Agent, or Firm* — Barlow, Josephs & Holmes, Ltd.

(57) ABSTRACT

A dispenser includes a dispenser body and a base, wherein the base is attached to the dispenser body and a piston in the base is seated in a fluid passage of the dispenser body to define a dispensing chamber which may be filled by movement of the dispenser body relative to the base and emptied by the return of the dispenser body to the original position relative to the base.

18 Claims, 4 Drawing Sheets

DISPENSERS AND METHODS FOR USING THE SAME

CROSS-REFERENCE TO RELATED APPLICATIONS

This application is a continuation of U.S. application Ser. No. 15/538,749, filed Jun. 22, 2017, which is a Section 371 National Phase filing of PCT/EP2015/081042, filed Dec. 22, 2015. PCT/EP2015/081042 claims the benefit of U.S. Provisional Application No. 62/096,125 filed Dec. 23, 2014, the entire contents of which are incorporated herein by reference.

BACKGROUND OF THE DISCLOSURE

Field of the Invention

Embodiments of the invention relate to dispensers and more particularly to dispensers capable of dispensing a dose or continuous stream of liquid or pasty product onto a surface.

State of the Art

Dispensers are well known and are used to dispense any variety of fluids. For example, dispensers are used to dispense soaps, perfumes, food additives, colorings and other liquids onto a surface, into the palm of one's hand, or into any other desired location. Often times, a dispenser may include a pump to move or transport a fluid through the dispenser for dispensing.

While dispensers are well known, there is a need to create dispensers and dispensing products that are easier to make and/or are less costly to make. This is especially important as companies attempt to establish markets for their products using dispensers in less developed countries. It is also important as companies look for alternative ways to dispense liquid products at a lower cost.

SUMMARY OF THE INVENTION

According to various embodiments of the invention, a simple dispenser is provided. The dispenser may include a dispenser body and a base. The base may be attached to the dispenser body and a piston on the base may be sealingly engaged with a fluid passage in the dispenser body. The base piston and stem may define a dispensing chamber with the fluid passage and the dispensing chamber may be filled with fluid upon movement of the dispenser body closer to the base. Upon return of the base and dispenser body to the original position, fluid in the dispensing chamber may be dispensed.

According to some embodiments of the invention, a dispenser includes a dispenser body and a base. The dispenser body includes walls forming a space or cavity within the dispenser body. A cap over a portion of the dispenser body may form a reservoir within the dispenser body. The base may include a piston which may be inserted in a fluid passage in the dispenser body. The piston may prevent fluid from flowing from the reservoir and out of the dispenser when the dispenser has not been actuated. The piston—in combination with the fluid passage and a stem of the base—may form a dispensing chamber. The dispensing chamber may be filled upon actuation of the dispenser and then emptied as actuation ends.

In some embodiments of the invention, a dispenser uses a cup spring and one or more cup spring ribs to facilitate movement of the dispenser body relative to the base. In other embodiments of the invention, a spring may be used to facilitate movement of the dispenser body relative to the base.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
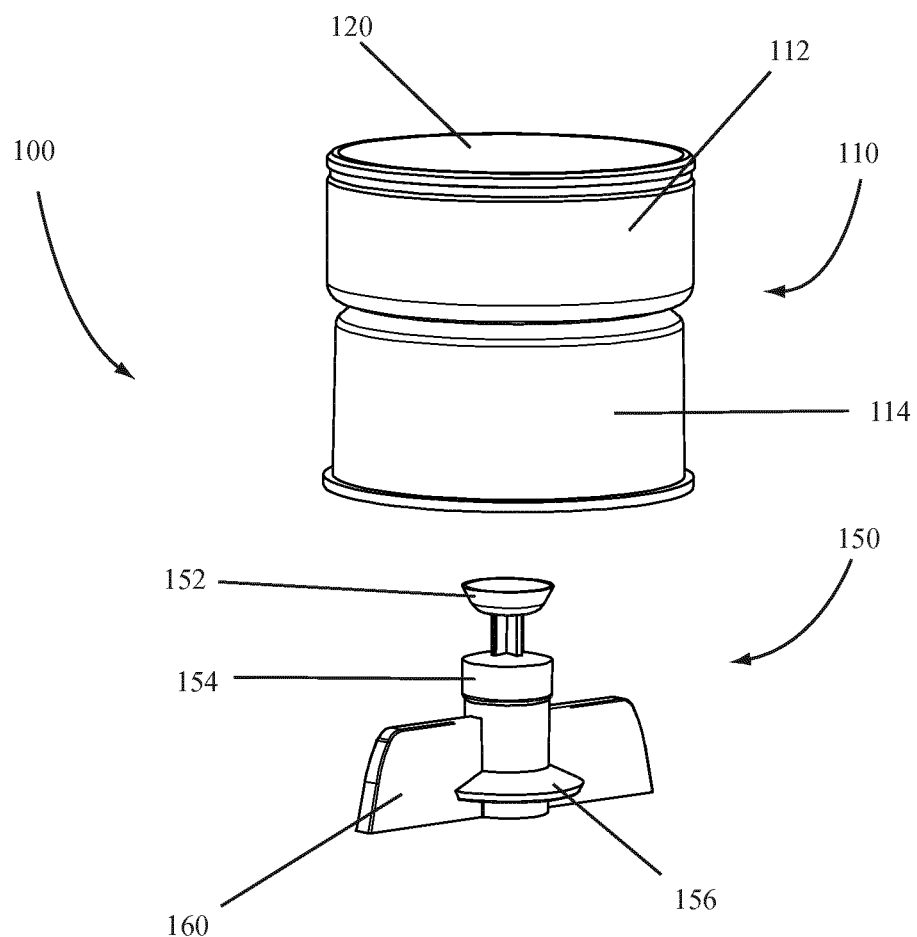
FIG. 1 illustrates an exploded view of a dispenser according to various embodiments of the invention.

According to various embodiments of the invention, a dispenser 100 may include a dispenser body 110 and a base 150.

A dispenser body 110 according to various embodiments of the invention may include a wall 112 and a cup spring 114. A cap 120 or lid may be seated on an upper edge or rim of the wall 112 such that an open space or cavity is at least partially defined by the interior of the wall 112 and the interior of the cap 120. The cup spring 114 may extend away from the wall 112 and may act as a spring when the dispenser 100 is in use.

A base 150 of a dispenser 100 according to various embodiments of the invention may include one or more cup spring ribs 160, a piston 152 or piston seal, a stem 154 and a fluid disbursement feature 156.

Figure 2:
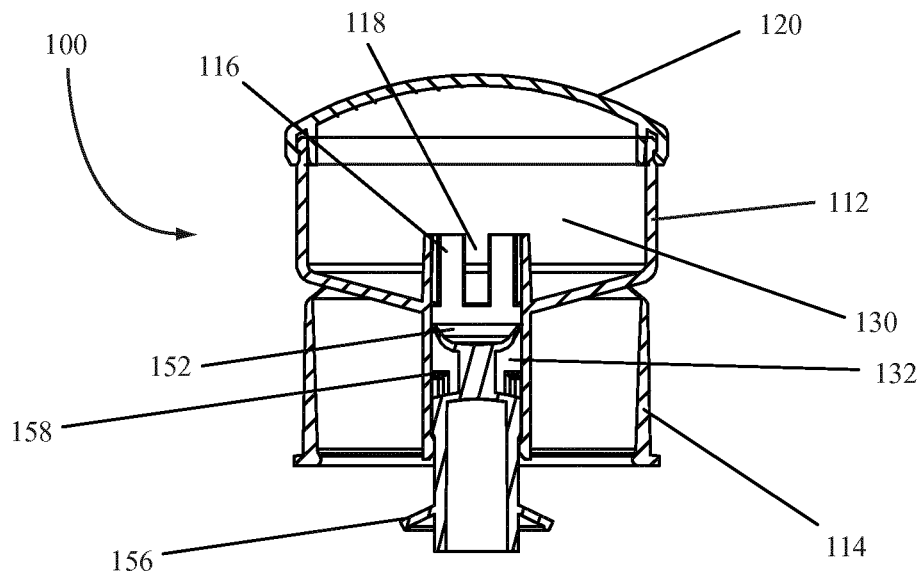
FIG. 2 illustrates a side cross-sectional view of a dispenser according to various embodiments of the invention.
Figure 3:
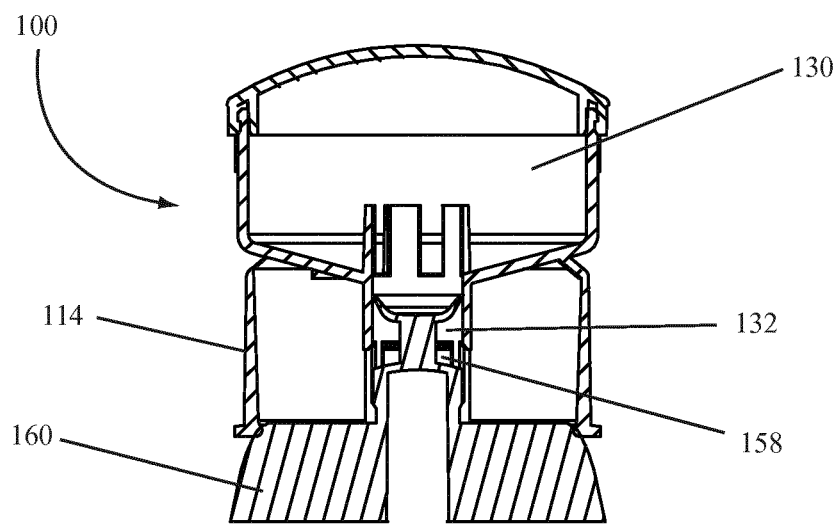
FIG. 3 illustrates a front cross-section view of a dispenser according to various embodiments of the invention.

According to various embodiments of the invention, a dispenser 100 may be formed by inserting a portion of the base 150 into a portion of the dispenser body 110. A cross-sectional image of an assembled dispenser 100 according to various embodiments of the invention is illustrated in FIGS. 2 and 3. The cross-sectional view illustrated in FIG. 2 shows a side-view of the dispenser 100 looking at the dispenser 100 from an edge of a cup spring rib 160. The cross-sectional view illustrated in FIG. 3 shows a front-view of the dispenser 100 looking at the dispenser 100 from the flat portions of the cup spring ribs 160. In other words, FIG. 3 is a view that is rotated ninety degrees from the view illustrated in FIG. 2.

As illustrated in FIG. 2, the base 150 is inserted into an interior channel formed in the dispenser body 110. The wall 112 of the dispenser body 110 slopes from an outer wall portion towards an axis running through an interior of the dispenser 100 such that the sloping wall 112 forms a base wall or bottom of a space within the dispenser body 110. A passage through the base wall of the dispenser body 110 is defined by walls formed therein. The passage may be circular, square, elliptical, or any other desired shape. According to some embodiments of the invention, the passage may extend into an interior space within the dispenser body 110 as illustrated in FIG. 2. The extension into the interior space may include one or more fluid inlet projections 116 and one or more fluid inlet openings 118 defined therein. The interior space defined by the interior of the wall 112, the interior of the cap 120, and the fluid passage area may act as a reservoir 130 for a fluid or pasty product.

A portion of the base 150 may be inserted into the fluid passage. For example, as illustrated in FIG. 2, a piston 152 may be inserted into the fluid passage. The piston 152 may include a seal ring about an outer edge of the piston 152 such that the seal ring may seal against the inner walls or surface of the fluid passage. The seal formed between the piston 152 and the fluid passage may be sufficient to retain fluid or prevent fluid from passing by the piston 152 through the fluid passage. For instance, in the configuration illustrated in FIGS. 2 and 3, fluid in the reservoir 130 and upper portion of the fluid passage are prevented from flowing past the piston 152 due to the seal between the piston 152 and the walls of the fluid passage.

Beneath the piston 152 illustrated in FIG. 2, the base 150 may include a stem 154 having a wide diameter and a narrow diameter. The narrow diameter may be between the wide diameter and the piston 152 as illustrated. The narrow diameter may be narrower than—or have a smaller diameter than—the interior of the fluid passageway such that a dispensing chamber 132 is formed in the area between the wider diameter portion of the stem 154 and the piston 152 and as defined by the fluid passage walls. In some embodiments, the stem 154 may also include a seal ring about the wider diameter portion of the stem 154 and that seal ring may seal against a portion of the fluid passage interior walls. In some instances, the fluid passage may also act in combination with the stem 154 as a guide for movement of the dispenser body 110 relative to the base 150.

As illustrated in FIG. 2, one or more fluid outlet openings 158 may be located in and through the fluid passage walls within the dispensing chamber 132. The one or more fluid outlet openings 158 may allow fluid within the dispensing chamber 132 to drain from the dispensing chamber 132 to atmosphere or down to a surface upon which the base 150 may be resting.

According to various embodiments of the invention, the configuration, shape, size and other features of the dispensing chamber 132 may be altered such that the dispensing chamber 132 contains, or may contain, a desired quantity of fluid. Thus, the dispensing chamber 132 may be customized such that actuation of the dispenser 100 will dispense a relatively or substantially precise dose of fluid during each actuation.

The base 150 may also include one or more fluid disbursement features 156 as illustrated in FIG. 2. A fluid disbursement feature 156—such as that illustrated—may direct fluid disbursed from or draining from the dispensing chamber 132 away from the base 150 or in a desired direction. In addition, a fluid disbursement feature 156 may be used to disburse the fluid being dispensed.

The same embodiment of the dispenser 100 illustrated in FIG. 2 is illustrated in FIG. 3 from another angle. As illustrated, the sup spring 114 of the dispenser body 110 may rest on one or more cup spring ribs 160 of the base 150. The cup spring ribs 160 may expand or deform the cup spring 114 as the dispenser body 110 is displaced closer to the base 150 or downward over the base 150. For example, actuation of the dispenser 100 requires a user to apply force to the cap 120 or top of the dispenser 100, pushing the dispenser body 110 and base 150 together. As the dispenser body 110 and base 150 are pushed closer together, the cup spring 114 may deform and slide over the outer edges of the cup spring ribs 160. Upon release of the actuation force on the dispenser 100, the deformation of the cup spring 114 is corrected by the nature of the cup spring 114 material—for example an elastomeric material—such that the cup spring 114 returns the dispenser body 110 to the original position. In this way, the cup spring 114 in combination with the cup spring ribs 160 acts as a spring for the dispenser 100 to return the dispenser 100 to a non-actuated state following actuation thereof.

Figure 4:
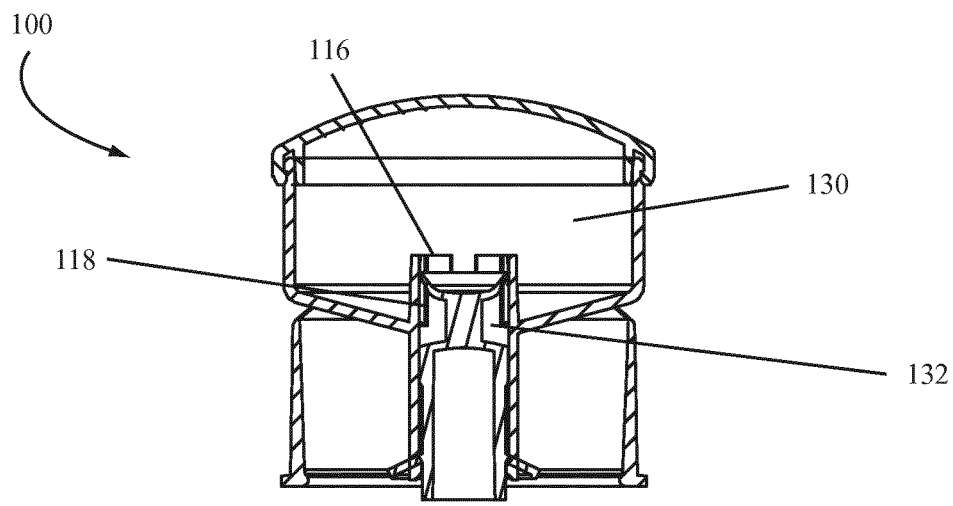
FIG. 4 illustrates a side cross-sectional view of a dispenser according to various embodiments of the invention.
Figure 5:
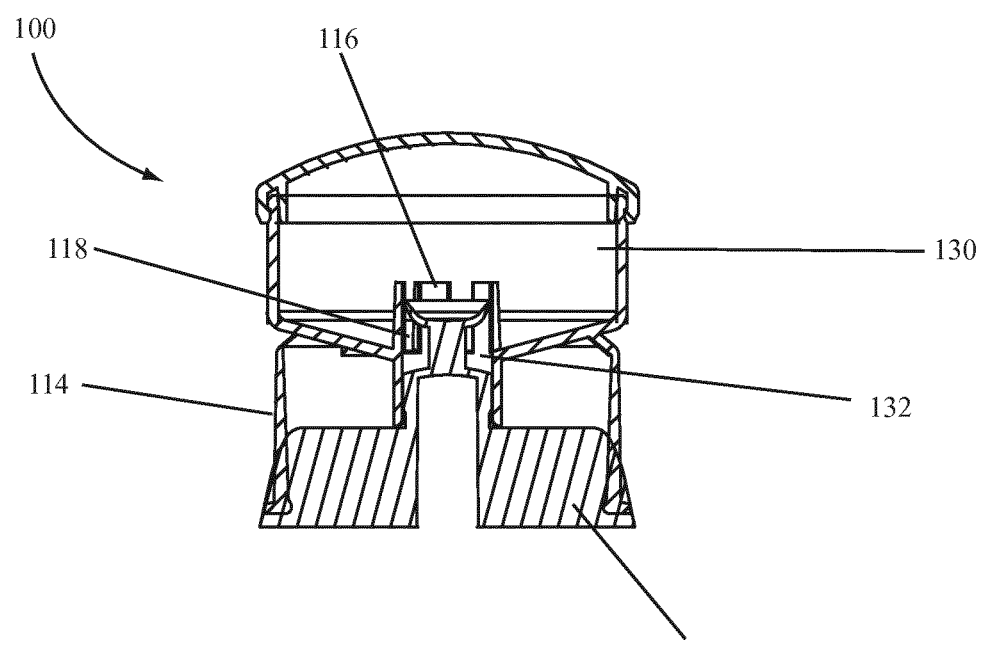
FIG. 5 illustrates a front cross-section view of a dispenser according to various embodiments of the invention.

Upon actuation of the dispenser 100, the dispenser body 110 is pushed closer to the base 150 and the position of the piston 152 relative to, or within, the fluid passage is changed as illustrated in FIGS. 4 and 5. Each of FIGS. 4 and 5 illustrate a dispenser 100 according to embodiments of the invention during actuation. The illustration in FIG. 4 corresponds to the same view as that of FIG. 2 and the illustration in FIG. 5 corresponds to the same view as that of FIG. 3.

As illustrated in FIGS. 4 and 5, when the dispenser body 110 is pushed downward, the cup spring 114 expands about the cup spring ribs 160. The fluid passage is also moved relative to the piston 152 such that the one or more fluid inlet openings 118 are in communication with both the reservoir 130 and the dispensing chamber 132. The fluid communication between the reservoir 130 and the dispensing chamber 132 allows fluid to flow from the reservoir 130 into the dispensing chamber 132. As illustrated, in this position, the one or more fluid outlet openings 158 are not in fluid communication with the dispensing chamber 132; instead, they are below a seal with the stem 154 such that fluid from the dispensing chamber 132 cannot flow through the fluid outlet openings 158.

Upon release of the force on the dispenser body 110, the cup spring 114 acts in combination with the cup spring ribs 160 to return the dispenser body 110 to the position illustrated in FIGS. 2 and 3. As the dispenser body 110 returns to that position, the piston 152 forms a seal with the interior wall of the fluid passageway, stopping inflow of fluid from the reservoir 130 into the dispensing chamber 132 and trapping fluid in the dispensing chamber 132. As the dispenser body 110 continues to move, the one or more fluid outlet openings 158 are moved into the dispensing chamber 132, opening a path for fluid from within the dispensing chamber 132 to drain through the one or more fluid outlet openings 158. The fluid released from the dispensing chamber 132 may be disbursed by a fluid disbursement feature 156.

Figure 6:
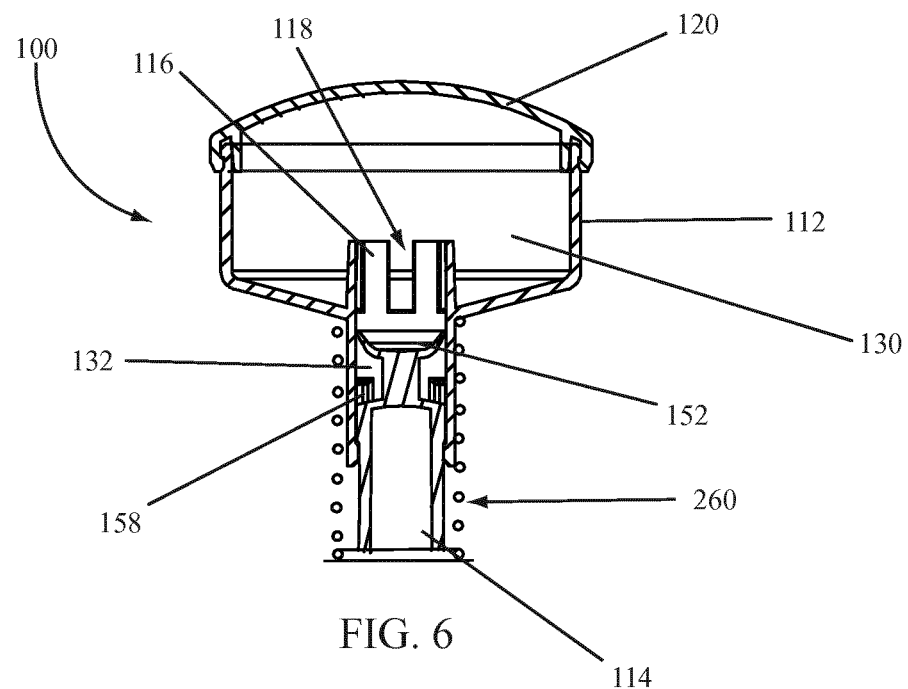
FIG. 6 illustrates a side-cross sectional view of a dispenser according to various embodiments of the invention.
Figure 7:
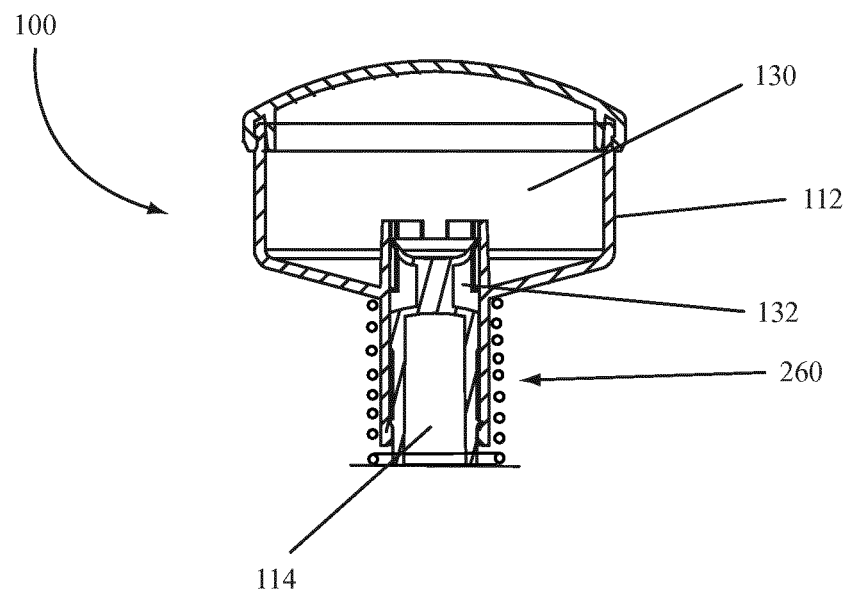
FIG. 7 illustrates a side-cross sectional view of a dispenser according to various embodiments of the invention.]

An alternate embodiment of a dispenser 100 according to various embodiments of the invention is illustrated in FIGS. 6 and 7. FIG. 6 illustrates the dispenser 100 in an "up" position and FIG. 7 illustrated the dispenser 100 in a "down" position during actuation. As illustrated in FIGS. 6 and 7, instead of a cup spring 114 and cup spring ribs 160 combination, a dispenser 100 may include a spring 260 to act upon the dispenser body 110 during operation of the dispenser 100. A spring 260 may include any type of spring and may be made of any desired material. For example, a metal or plastic coil spring may be used as illustrated. A leaf spring or other spring could also be substituted and used with various embodiments of the invention. In addition, the dispenser 100 illustrated in FIGS. 6 and 7 does not include a fluid disbursement feature 156.

According to various embodiments of the invention, a dispenser 100 may be made of any desired material. In some embodiments, a dispenser 100 may be molded from resin. The dispenser body 110 and base 150 may be molded using the same resin or polymer or different resins or polymers. For example, both the dispenser body 110 and base 150 may be molded of high-density polypropylene, low-density polypropylene, or medium-density polypropylene, or any combination thereof.

According to various embodiments of the invention, a dispenser 100 may be used to dispense a product such as a fluid or pasty product. A fluid contained in the reservoir 130 may be dispensed by actuating and releasing the dispenser body 110 such that the dispenser body 110 moves relative to the base 150 to fill the dispensing chamber 132 and dispense a quantity of fluid therefrom. A dispenser 100 according to various embodiments of the invention may be used with any fluid desired. For example, a dispenser 100 according to various embodiments of the invention may be used to dispense a lotion, a soap, a fragrance product, food products, cleaning agents, insecticides, pest control formulations or any other desired fluid product.

In some embodiments of the invention, the cap 120 may be removable such that the reservoir 130 may be refilled with a desired fluid for dispensing. In other embodiments, the dispenser 100 may include a refillable cartridge that may be placed in the reservoir 130 such that a fluid will be dispersed from the refillable cartridge into the reservoir 130. In other embodiments, a cartridge may be inserted into the reservoir 130 such that the cartridge is opened and fluid is allowed to disperse into the reservoir 130 for use with the dispenser 100.

Having thus described various embodiments of the invention it is understood that the invention is not limited by the embodiments described, by the illustrations, or by the claims herein.

What is claimed is:

1. A dispenser, comprising:
    a body having a bottom wall and a fluid passage extending through the bottom wall, wherein the fluid passage is defined, at an upper end in the body, by a plurality of fluid inlet projections extending upward from the bottom wall and a plurality of fluid inlet openings therebetween, the fluid passage further having a lower fluid passage portion extending through the bottom wall, the lower fluid passage portion including a dispensing chamber therein;
    a cup spring wall extending downwardly from the bottom wall of the body; and
    a base, comprising:
        a stem at least partially received in the lower fluid passage portion;
        a dispensing structure associated with the stem; and
        at least one cup spring rib extending radially from the stem.

2. The dispenser of claim 1, wherein the cup spring is made of an elastomeric material.

3. The dispenser of claim 1 comprising two opposed cup spring ribs.

4. The dispenser of claim 1 further comprising a seal on an outer edge of the stem.

5. The dispenser of claim 2 further comprising a seal on an outer edge of the stem.

6. The dispenser of claim 3 further comprising a seal on an outer edge of the stem.

7. The dispenser of claim 1 wherein the fluid passage extends downwardly from the bottom wall.

8. The dispenser of claim 3 wherein the fluid passage extends downwardly from the bottom wall.

9. The dispenser of claim 4 wherein the fluid passage extends downwardly from the bottom wall.

10. A cup spring assembly comprising:
    a body having a bottom wall with a passage therethrough, wherein the passage is defined, at an upper end in the body, by a plurality of inlet projections and a plurality of inlet openings therebetween, the passage having a lower passage portion extending through the bottom wall, the lower passage portion including a dispensing chamber therein;
    an annular spring wall extending downwardly from the bottom wall; and
    a base having a stem which is at least partially received in the lower passage portion, and at least one cup spring rib extending radially from the stem, the cup spring rib interacting with the annular spring wall to provide a spring force.

11. The cup spring assembly of claim 10, wherein the annular spring wall is made of an elastomeric material.

12. The cup spring assembly of claim 10 comprising two opposed cup spring ribs.

13. The cup spring assembly of claim 10 further comprising a seal on an outer edge of the stem.

14. The cup spring assembly of claim 11 further comprising a seal on an outer edge of the stem.

15. The cup spring assembly of claim 12 further comprising a seal on an outer edge of the stem.

16. The cup spring assembly of claim 10 wherein the passage extends downwardly from the bottom wall.

17. The cup spring assembly of claim 12 wherein the passage extends downwardly from the bottom wall.

18. The cup spring assembly of claim 14 wherein the passage extends downwardly from the bottom wall.

* * * * *

UNITED STATES PATENT AND TRADEMARK OFFICE
CERTIFICATE OF CORRECTION

PATENT NO. : 10,655,998 B2
APPLICATION NO. : 16/280658
DATED : May 19, 2020
INVENTOR(S) : Moreno Aparicio et al.

It is certified that error appears in the above-identified patent and that said Letters Patent is hereby corrected as shown below:

On the Title Page

Item (63), under the heading "Related U.S. Application Data," the paragraphs reading "Continuation of application No. 15/538,749, filed as applcation no. PCT/EP2016/074628 on Oct. 13, 2016, now Pat. No. 10,228,272. Provisional applcation No. 62/420,788, filed on Oct. 13, 2015" should read "Continuation of application No. 15/538,749, filed as application no. PCT/EP2015/081043 on Dec. 22, 2015, now Pat. No. 10,228,272. Provisional application No. 62/096,125, filed on Dec. 23, 2014."

In the Specification

In Column 1, Lines 7-13, reading "This application is a continuation of U.S. application Ser. No. 15/538,748, filed Jun. 22, 2017, which is a Section 371 National Phase filing of PCT/EP2015/081042, filed Dec. 22, 2015. PCT/EP2015/081042 claims benefit of U.S. Provisional Application No. 62/096,125 filed Dec. 23, 2014, the entire contents of which are incorporated by reference." should read "This application is a continuation of U.S. application Ser. No. 15/538,749, filed Jun. 22, 2017, which is a Section 371 National Phase filing of PCT/EP2015/081043, filed Dec. 22, 2015. PCT/EP2015/081043 claims the benefit of U.S. Provisional Application No. 62/096,125 filed Dec. 23, 2014, the entire contents of which are incorporated herein by reference."

Signed and Sealed this
Thirty-first Day of May, 2022

Katherine Kelly Vidal
*Director of the United States Patent and Trademark Office*